United States Patent
Sköldberg et al.

(10) Patent No.: US 12,337,680 B2
(45) Date of Patent: Jun. 24, 2025

(54) DRIVELINE ARRANGEMENT

(71) Applicant: VOLVO CONSTRUCTION EQUIPMENT AB, Eskilstuna (SE)

(72) Inventors: Per-Anders Sköldberg, Växjö (SE); Per Mattsson, Sölvesborg (SE)

(73) Assignee: VOVLO CONSTRUCTION EQUIPMENT AB, Eskilstuna (SE)

( * ) Notice: Subject to any disclaimer, the term of this patent is extended or adjusted under 35 U.S.C. 154(b) by 168 days.

(21) Appl. No.: 18/140,176

(22) Filed: Apr. 27, 2023

(65) Prior Publication Data
US 2023/0382221 A1 Nov. 30, 2023

(30) Foreign Application Priority Data
May 24, 2022 (EP) .................... 22175097

(51) Int. Cl.
*B60K 1/02* (2006.01)
*B60K 17/08* (2006.01)
*B60K 17/28* (2006.01)
*B60K 17/354* (2006.01)
*B60K 17/356* (2006.01)
*F16H 61/04* (2006.01)
*F16H 63/30* (2006.01)
*F16H 63/34* (2006.01)

(52) U.S. Cl.
CPC ............ *B60K 17/354* (2013.01); *B60K 1/02* (2013.01); *B60K 17/08* (2013.01); *B60K 17/28* (2013.01); *B60K 17/356* (2013.01); *F16H 61/0403* (2013.01); *F16H 63/3023* (2013.01); *F16H 63/34* (2013.01); *F16H 2200/0017* (2013.01); *F16H 2200/0021* (2013.01)

(58) Field of Classification Search
CPC ......... B60K 17/08–17/356; B60K 1/02; B60L 2240/12; B60L 15/2072; B60L 15/2054; B60L 15/20
See application file for complete search history.

(56) References Cited

U.S. PATENT DOCUMENTS

2003/0155165 A1 8/2003 Kelledes et al.
2009/0062069 A1* 3/2009 Nedachi .................. F16H 61/16
477/97
(Continued)

FOREIGN PATENT DOCUMENTS

DE 102019203722 A1 9/2020
DE 112019001944 T5 4/2021
(Continued)

OTHER PUBLICATIONS

Partial European Search Report, EP Application No. 22175097.9, mailed Nov. 29, 2022, 16 pages.

*Primary Examiner* — Ernesto A Suarez
*Assistant Examiner* — Lillian T Nguyen
(74) *Attorney, Agent, or Firm* — Sage Patent Group

(57) ABSTRACT

The disclosed subject matter relates to a driveline arrangement including a first driveline, a second driveline, and a control unit connected to the first and second drivelines, the control unit comprising control circuitry configured to control the second driveline to assume a disengaged state in which the second driveline is disconnected from propelling a second pair of wheels when a speed of the working machine exceeds a predetermined threshold speed limit.

15 Claims, 7 Drawing Sheets

(56) References Cited

U.S. PATENT DOCUMENTS

| | | |
|---|---|---|
| 2019/0168598 A1 | 6/2019 | Hattori |
| 2020/0114769 A1 | 4/2020 | Moubarak et al. |
| 2021/0107456 A1* | 4/2021 | Kim .................... B60L 3/108 |
| 2021/0316712 A1* | 10/2021 | Huh ..................... B60K 6/52 |
| 2022/0017092 A1* | 1/2022 | Kim .................... B60W 10/192 |
| 2022/0194224 A1* | 6/2022 | Yoon .................... F16D 23/10 |
| 2022/0324321 A1* | 10/2022 | David .................. B60K 7/0007 |
| 2022/0389989 A1* | 12/2022 | Mattsson .............. B60K 17/00 |

FOREIGN PATENT DOCUMENTS

| | | |
|---|---|---|
| DE | 102021122301 A1 | 3/2022 |
| EP | 2762351 A1 | 8/2014 |
| EP | 3750733 A1 | 12/2020 |
| GB | 2594280 A | 10/2021 |
| WO | 2020187878 A1 | 9/2020 |
| WO | 2021078372 A1 | 4/2021 |
| WO | 2021121594 A1 | 6/2021 |

\* cited by examiner

DRIVELINE ARRANGEMENT

CROSS REFERENCE TO RELATED APPLICATIONS

This application claims priority to European Patent Application No. 22175097.9, filed on 24 May 2022, the disclosure and content of which is incorporated by reference herein in its entirety.

TECHNICAL FIELD

The present disclosure relates to a driveline arrangement for propelling a working machine. The present disclosure also relates to a working machine comprising such a driveline arrangement, and a method of controlling a driveline arrangement. The present disclosure is applicable on working machines within the fields of industrial construction machines or construction equipment, in particular articulated or rigid haulers. Although the present disclosure will be described with respect to an articulated hauler, the present disclosure is not restricted to this particular machine, but may also be used in other working machines such as wheel loaders, excavators, and backhoe loaders, etc.

BACKGROUND

In connection with transportation of heavy loads at construction sites or the like, a working machine is often used. The working machines may be utilized for transportations in connection with road or tunnel building, sand pits, mines, forestry, and similar environments, and are often provided in the form of an articulated hauler or a rigid hauler.

Recently, not only cars are using electric machines as prime mover(s) for propulsion, also working machines are striving to use such more environmentally friendly prime mover. The electric machines can be arranged to propel one drive axle independently of other drive axles of the working machine. Multiple advantages can be achieved by using electric machines to propel the working machine in this way, such as omitting the need of using differential clutches and other mechanical transmission elements between the drive branches. Also, advanced control algorithms can be applied for distributing torque between the branches. However, within the rough terrain at which the working machine is frequently operated, it is required that the vehicle is able to operate in a desired manner, and high quality of the driveline arrangement is necessary. In detail, the working machine must fulfil the demand for sufficient rim pull and maximum speed.

There is thus a desire to further improve driveline arrangements provided with electric machines for propelling a working machine.

SUMMARY

It is an object of the present disclosure to provide a driveline arrangement that at least partially overcomes the above-described deficiencies. This is achieved by a driveline arrangement according to claim 1.

According to a first aspect, there is provided a driveline arrangement for propelling a working machine, the driveline arrangement comprising a first driveline comprising a first electric machine and a first transmission arrangement, the first driveline being configured to propel a first pair of wheels at a speed range between zero speed and a maximum speed limit of the working machine, a second driveline comprising a second electric machine and a second transmission arrangement, the second driveline being configured to propel a second pair of wheels at a speed range between zero speed and a predetermined threshold speed limit of the working machine, wherein the predetermined threshold speed limit is lower than the maximum speed limit, and a control unit connected to the first and second drivelines, the control unit comprising control circuitry configured to control the second driveline to assume a disengaged state in which the second driveline is disconnected from propelling the second pair of wheels when a speed of the working machine exceeds the predetermined threshold speed limit.

The first driveline and the second driveline should here be construed as to propel different pair of wheels, i.e., the first and second drivelines are mechanically decoupled from each other. Hence, the first driveline is dedicated to propel the first pair of wheels, while the second driveline is dedicated to propel the second pair of wheels, which second pair of wheels is different from the first pair of wheels. As will be described further below, the second driveline may also be configured to propel a third pair of wheels, which third pair of wheels is different from the first pair of wheels as well as different from the second pair of wheels. Hence, the second driveline may be dedicated to propel more than one pair of wheels.

Further, the control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

The present disclosure is based on the insight that by providing one driveline, i.e., the first driveline, which is operable between zero speed and a maximum speed limit of the working machine, and another driveline, i.e. the second driveline, which is operable between zero speed and a speed limit below the maximum speed limit, the different drivelines can be controlled to fulfil the overall task of the working machine. The first and second drivelines are thus complementary to each other. In detail, when an increased torque is desired at lower speed, both the first driveline and the second driveline are operated to propel the working machine, while only the first driveline is used for propelling the working machine at higher speed. Put it differently, the first and second drivelines have different transmission characteristics to manage the range of torque and speed as conventionally necessary for a working machine.

By using drivelines with different characteristics, the second driveline can be made less complex since it does not need to fulfil the requirements of propelling the working machine throughout the entire torque and speed span. Accordingly, the second driveline can be provided with a simpler electric machine and/or a simpler transmission arrangement compared to the first driveline. For example, a lower number of gear stages can be provided for the second transmission arrangement compared to the number of gear stages for the first transmission arrangement thereby reducing the need for a relatively high number of transmission components in the second transmission arrangement, i.e., a lower number of shift elements, gear wheels, valves, etc. Accordingly, the overall cost due to the reduced number of transmission components for the driveline arrangement can be reduced while still fulfilling the torque and speed range requirements of the working machine. As another alternative, the second driveline can be provided with a second electric machine operable within a smaller rpm range compared to the rpm range operable by the first electric machine.

According to an example embodiment, the second transmission arrangement may comprise a neutral gear stage, the control circuitry may be configured to control the second driveline to arrange the second transmission arrangement in the neutral gear stage when controlling the second driveline to assume the disengaged state. Hereby, the second driveline will freewheel when the working machine reaches the predetermined threshold speed limit. The second driveline, and in particular the second electric machine, will thus not act as an inertia for the driveline arrangement when not in use.

According to an example embodiment, each one of the first and second transmission arrangements may comprise at least two torque transmitting gear stages.

The torque transmitting gear stages should be construed as gear stages where torque is transmitted through the transmission arrangement. Thus, a neutral gear stage is not to be construed as a torque transmitting gear stage since no torque is transmitted from an electric machine to the wheels of the working machine when a transmission arrangement assumes the neutral gear stage.

An advantage is that a neutral gear stage is obtainable for the first and second transmission arrangements.

According to an example embodiment, the first transmission arrangement may comprise at least three torque transmitting gear stages and the second transmission arrangement may comprise no more than two torque transmitting gear stages.

Accordingly, the first and second transmission arrangements use different number of torque transmitting gear stages. The second transmission arrangement can thus, and as also indicated above, be made more simple compared to the first transmission arrangement. In other words, the second transmission arrangement can be designed with a lower number of transmission components compared to the number of transmission components of the first transmission arrangement.

According to an example embodiment, the first transmission arrangement may comprise a plurality of friction shift elements for changing between gear stages. Also, and according to an example embodiment, the control circuitry may be configured to control one of the friction shift elements to assume a slipping state during a gear shift. The first transmission arrangement may hereby be configured to provide power shifting when shifting between torque transmitting gear stages. Power shifting should be construed as a gear shift with retained power and torque transfer.

According to an example embodiment, the second driveline may be further configured to propel a third pair of wheels at the speed range between zero speed and the predetermined threshold speed limit of the working machine.

According to an example embodiment, the driveline arrangement may further comprise an additional electric machine configured to propel a hydraulic auxiliary unit of the working machine, the additional electric machine being connectable to the first driveline.

According to an example embodiment, the control circuitry may be configured to control the first driveline to connect to the additional electric machine for propelling the first pair of wheels when the second driveline assumes the disengaged state.

Hereby, and if needed, the additional electric machine may supply power for propelling the working machine, then replacing power from the second electric machine. At high speeds of the working machine, the hydraulic auxiliary unit consumes a low amount of power, and the additional electric machine may well be used to assist in compensating for the second electric machine not being used.

The additional electric machine may be connected to the first driveline either before the second driveline assumes the disengaged state, or at the point in time when the second driveline assumes the disengaged state.

According to an example embodiment, the first transmission arrangement may comprise a plurality of planetary gear sets, each planetary gear set comprising a set of planetary members, wherein the set of planetary members comprises a sun gear, a ring gear and a planet carrier carrying a set of planet gears.

According to an example embodiment, one member of the set of planetary members for each one of the plurality of planetary gear sets of the first transmission arrangement may be connected to one of the plurality of friction shift elements. The plurality of friction shift elements is hereby controlled to be engaged or disengaged when changing between different gear stages of the first transmission arrangement.

According to an example embodiment, the second transmission arrangement may comprise a plurality of planetary gear sets, each planetary gear set of the second transmission arrangement comprising a set of planetary members, wherein the set of planetary members comprises a sun gear, a ring gear and a planet carrier carrying a set of planet gears.

According to an example embodiment, the second transmission arrangement may comprise a gear selection arrangement, and a transmission housing, wherein the gear selection arrangement may comprise a first locking mechanism connected to a member of the set of planetary members for a first planetary gear set of the second transmission arrangement, the first locking mechanism being adapted to be controlled by a first fluid pressure conducted to the first locking mechanism such that for at least a first fluid pressure equal to zero overpressure, the first locking mechanism is adapted to assume a locked condition in which said member of the first planetary gear set is locked to the transmission housing, and a second locking mechanism connected to a member of the set of planetary members for a second planetary gear set of the second transmission arrangement, the second locking mechanism being adapted to be controlled by a second fluid pressure conducted to the second locking mechanism such that for at least a second fluid pressure equal to zero overpressure, the second locking mechanism is adapted to assume a locked condition in which said member of the second planetary gear set is locked to the transmission housing.

By means of the gear selection arrangement described above, the first and second locking mechanisms may be used in an energy efficient manner as a parking brake for instance. As such, in an embodiment in which a wheel or the like is connected to the second transmission arrangement, the first and second locking mechanisms may be used for locking such a wheel. When it is desired that e.g., the one of the members of the first set of planetary members be kept stationary for a certain amount of time, such a stationary condition may be achieved by simply reducing the first fluid pressure, possibly down towards zero overpressure, or to zero overpressure. Thus, the one member of the first set of planetary members may be kept stationary without the need for operating a fluid pressure source, such as a pump. The same applies when keeping the one member of the second set of planetary members stationary.

Furthermore, the disclosure enables for at least a portion of each one of the first and second locking mechanisms can be kept outside, or on the outside of, the transmission housing. Such a position implies that e.g., repair and maintenance operations may be performed in a straightforward manner.

According to a second aspect, there is provided a working machine, comprising a driveline arrangement according to any one of the embodiments described above in relation to the first aspect.

According to a third aspect, there is provided a method of controlling a driveline arrangement of a working machine, the driveline arrangement comprising a first driveline comprising a first electric machine and a first transmission arrangement, the first driveline being configured to propel a first pair of wheels at a speed range between zero speed and a maximum speed limit of the working machine, and a second driveline comprising a second electric machine and a second transmission arrangement, the second driveline being configured to propel a second pair of wheels at a speed range between zero speed and a predetermined threshold speed limit of the working machine, wherein the predetermined threshold speed limit is lower than the maximum speed limit, wherein the method comprises the steps of determining a speed of the working machine, comparing the speed of the working machine with the predetermined threshold speed limit, and disconnecting the second driveline from propelling the second pair of wheels when the speed of the working machine exceeds the predetermined threshold speed limit.

Effects and features of the second and third aspects are largely analogous to those described above in relation to the first aspect. Thus, the embodiments described above in relation to the first aspect are also applicable for the second and third aspects.

Further features of, and advantages with, the present disclosure will become apparent when studying the appended claims and the following description. The skilled person realize that different features may be combined to create embodiments other than those described in the following, without departing from the scope of the present disclosure.

BRIEF DESCRIPTION OF THE DRAWINGS

The above, as well as additional objects, features, and advantages of the present disclosure, will be better understood through the following illustrative and non-limiting detailed description of exemplary embodiments of the present disclosure, wherein.

DETAIL DESCRIPTION

Figure 1:
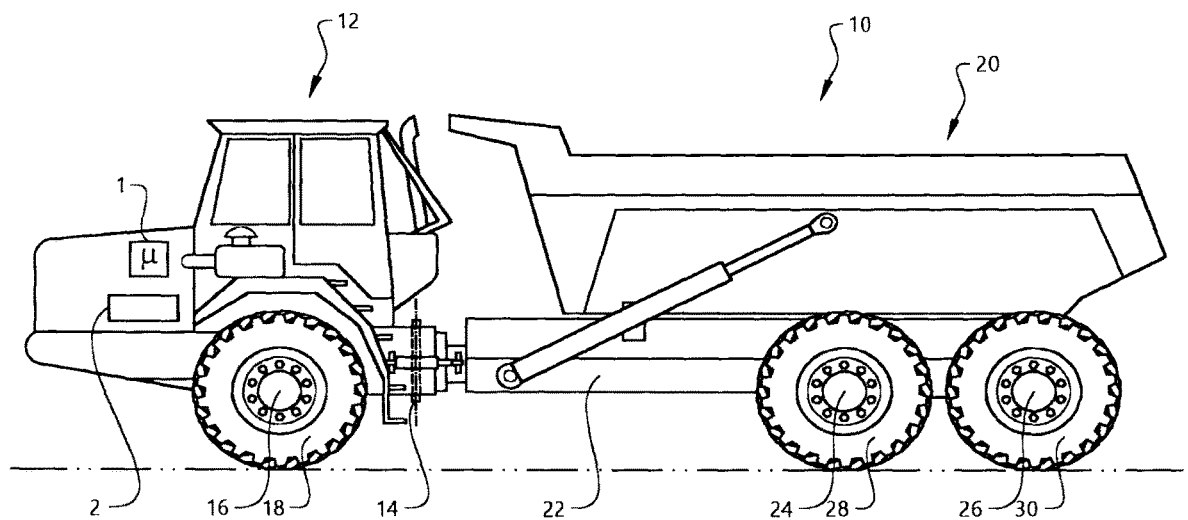
FIG. 1 is a side view of an exemplified working machine in the form of an articulated hauler.

The present disclosure will now be described more fully hereinafter with reference to the accompanying drawings, in which exemplary embodiments are shown. The disclosure may, however, be embodied in many different forms and should not be construed as limited to the embodiments set forth herein; rather, these embodiments are provided for thoroughness and completeness. Like reference character refer to like elements throughout the description.

Reference is made to FIG. 1, which is a lateral side view illustrating a working machine according to an example embodiment. The FIG. 1 working machine 10 is exemplified as a frame-steered articulated hauler, also called dumper.

Figure 2:
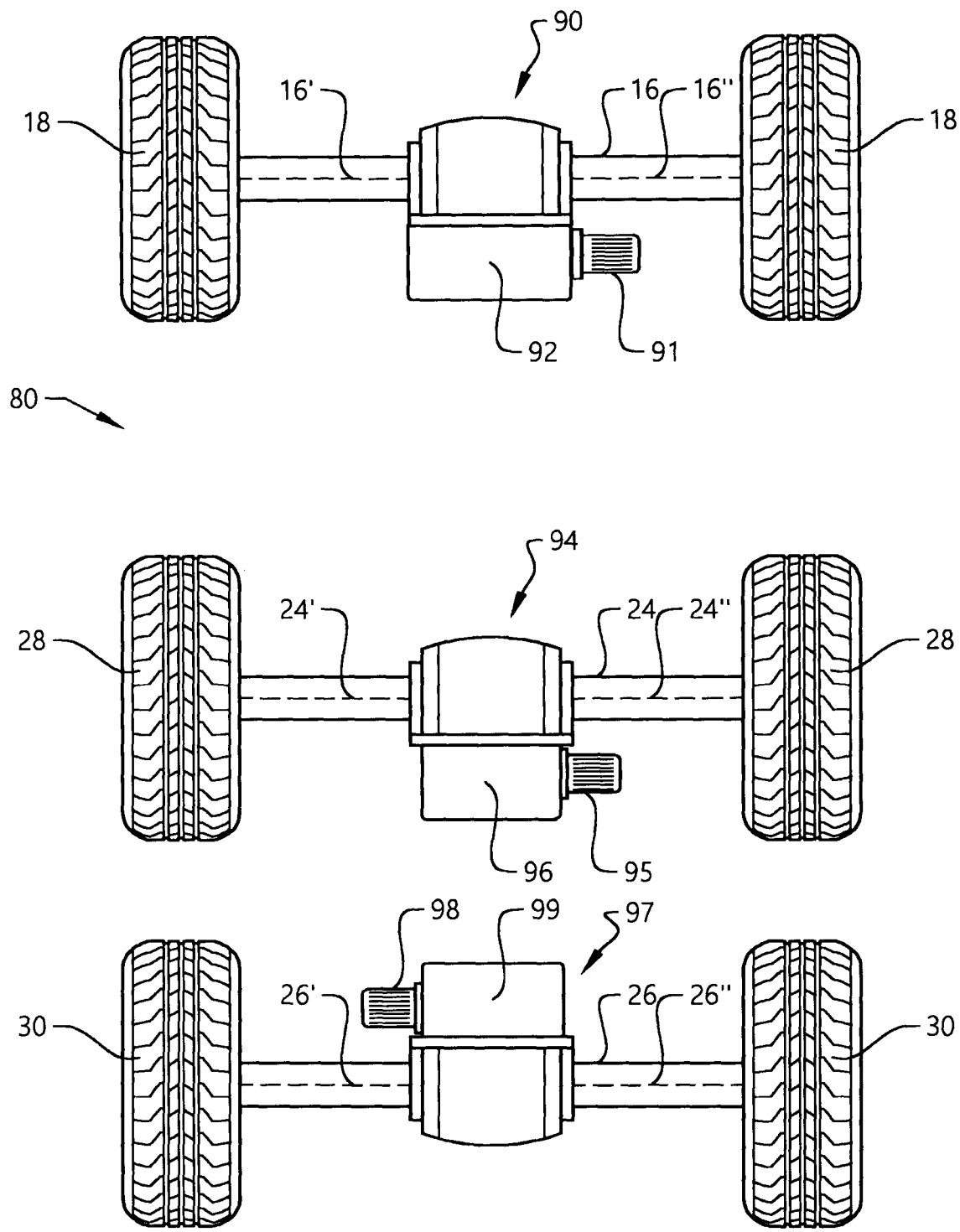
FIG. 2 is a schematic illustration of a driveline arrangement according to an example embodiment.

As can be seen from FIG. 1, the working machine 10 illustrated therein comprises a front working machine section 12 comprising a front frame 14 and a first wheel axle 16, also referred to as a front wheel axle 16. As can be seen in FIG. 2, the front wheel axle 16 is arranged as a casing housing a left 16' and right 16" first wheel shaft connected to a respective one of a first pair of wheels 18, although only the left front wheel is visible in FIG. 1. As will be evident below in relation to the disclosure of FIG. 2, the first pair of wheels 18 is propelled by a first driveline.

Moreover, as seen in FIG. 1, the working machine 10 comprises a rear working machine section 20 comprising a rear frame 22, a second wheel axle 24, also referred to as a front rear axle 24 and a third wheel axle 26, also referred to as a back rear axle 26. Again, with reference to FIG. 2, the front rear axle 24 is arranged as a casing housing a left 24' and right 24" second wheel shaft connected to a respective one of a second pair of wheels 28. As can also be seen in FIG. 2, the back rear axle 26 is arranged as a casing housing a left 26' and right 26" third wheel shaft connected to a respective one of a third pair of wheels 30.

Although the FIG. 1 embodiment of the working machine 10 comprises two rear axles 24, 26, it is also envisaged that embodiments of the working machine may be equipped with only one rear axle (not shown). The working machine 10 further comprises an energy storage system 2. The energy storage system is preferably configured to feed electric power to the below described electric machine(s) during propulsion. The energy storage system 2 is preferably a battery and can be configured to receive electrical power from a power grid. The battery may also be configured to receive electrical power from the below described electric machine(s) when using the electric machine(s) for braking the working machine, and/or from a fuel cell (not shown).

Moreover, the working machine 10 also comprises a control unit 1. The control unit 1 is coupled to the below described driveline(s) for controlling operation thereof. Further, the control unit 1 comprises control circuitry which may include a microprocessor, microcontroller, programmable digital signal processor or another programmable device. The control circuitry may also, or instead, each include an application specific integrated circuit, a programmable gate array or programmable array logic, a programmable logic device, or a digital signal processor. Where the control circuitry includes a programmable device such as the microprocessor, microcontroller or programmable digital signal processor mentioned above, the processor may further include computer executable code that controls operation of the programmable device. It should be understood that all or some parts of the functionality provided by means of the control circuitry may be at least partly integrated with an upper layer vehicle control unit (not shown) of the working machine. Accordingly, the control unit 1 thus controls gear shifting of the below described transmission arrangements as well as operation of the electric machines. When controlling gear shifting, the control unit 1 preferably controls operation of the various shift elements of the transmission arrangements.

As indicated above, the FIG. 1 working machine 10 is propelled by a driveline arrangement. In order to describe the driveline arrangement in further detail, reference is now made to FIG. 2, which schematically illustrates a driveline arrangement 80 according to an example embodiment. As can be seen in FIG. 2, the driveline arrangement 80 comprises a first driveline 90 connected to the first wheel axle 16 and configured to propel the first pair of wheels 18. The first driveline 90 comprises a first electric machine 91 and a first transmission arrangement 92. The first electric machine 91 is preferably electrically connected to the above described energy storage system 2 of the working machine 10. The first transmission arrangement 92 comprises a number of torque transmitting gear stages as will be exemplified below with reference to the description of FIGS. 3 and 4. Hence, the first transmission arrangement 92 is configured to increase or decrease the rotational speed from the first electric machine 91 to the left 16' and right 16" first wheel shafts, and in turn the first pair of wheels 18.

The driveline arrangement 80 also comprises a second driveline 94. The second driveline 94 is connected to the second wheel axle 24 and configured to propel the second pair of wheels 28. The second driveline 94 comprises a second electric machine 95 and a second transmission arrangement 96. The second electric machine 95 is preferably electrically connected to the above described energy storage system 2 of the working machine 10. The second transmission arrangement 96 comprises a number of torque transmitting gear stages as will be exemplified below with reference to the description of FIGS. 5 and 6. Hence, the second transmission arrangement 96 is configured to increase or decrease the rotational speed from the second electric machine 95 to the left 24' and right 24" second wheel shafts, and in turn the second pair of wheels 28.

As further exemplified in FIG. 2, the driveline arrangement 80 also comprises a third driveline 97. However, it should be readily understood that the present invention is fully functional with the use of solely the first 90 and second 94 drivelines, and the illustration of the third driveline 97 is merely for illustrating and describing a conceivable alternative example. As another alternative not depicted in the figures, the second driveline 94 may be connected also to the third wheel axle 26. In such case, the second driveline 94 propels the second 28 and third 30 pair of wheels in conjunction with each other.

The third driveline 97 is connected to the third wheel axle 26 and configured to propel the third pair of wheels 30. The third driveline 97 comprises a third electric machine 98 and a third transmission arrangement 99. The third electric machine 98 is preferably electrically connected to the above described energy storage system 200 of the working machine 10. The third transmission arrangement 99 comprises a number of torque transmitting gear stages which is preferably similar to those of the second transmission arrangement and exemplified below with reference to the description of FIGS. 5 and 6. Hence, the third transmission arrangement 99 is configured to increase or decrease the rotational speed from the third electric machine 98 to the left 26' and right 26" third wheel shafts, and in turn the third pair of wheels 30.

As is evident from the above description and depicted in FIG. 2, the first 18 and second 28 pair of wheels are individually propelled by a respective driveline 94, i.e., not propelled by a single motor which is the case for e.g., a working machine propelled by a single internal combustion engine.

The first driveline 90 is designed different compared to the second 94 and third 97 drivelines. In particular, the first driveline 90 is configured to propel the first pair of wheels 18 at a speed range between zero speed and a maximum speed limit of the working machine 10, i.e., throughout the entire speed span of the working machine. The second driveline 94, as well as the exemplified third driveline 97, are on the other hand configured to propel their respective wheels at a speed range between zero speed and a predetermined threshold speed limit of the working machine. The predetermined threshold speed limit is lower than the maximum speed limit. Accordingly, the second 94 and third 97 drivelines are not propelling their respective pair of wheels throughout the entire speed span of the working machine 10.

During operation, and as will be evident from the below description of FIG. 7, at lower speed when the torque demand is relatively high, the first driveline 90 propels the first pair of wheels 18. During this operating mode, the second driveline 94 simultaneously propels the second pair of wheels 28. When the driveline arrangement 80 comprises the third driveline 97 as exemplified in FIG. 2, the third driveline 97 also propels the third pair of wheels 30 when operating working machine 10 at the lower speed.

However, when the speed of the working machine 10 reaches the predetermined threshold speed limit, i.e., the maximum speed limit for the second 94 and third 97 drivelines, the second driveline 94 is disconnected from propelling the second pair of wheels 28, and the third driveline 97 is disconnected from propelling the third pair of wheels 30. The second driveline 94 can be disconnected from propelling the second pair of wheels 28 by e.g., controlling the second transmission arrangement 96 to assume a neutral gear stage. In a similar vein, the third driveline 97 can be disconnected from propelling the third pair of wheels 30 by e.g., also controlling the third transmission arrangement 99 to assume a neutral gear stage.

Accordingly, when the working machine 10 is driven at a speed above the predetermined threshold speed limit, the working machine 10 is solely propelled by the first driveline 90. It should be readily understood that the second 94 and third 97 drivelines may be disconnected from propelling their respective wheels at different predetermined threshold speed limits. Hence, the second 94 and third 97 drivelines may be sequentially disconnected from propelling their respective wheels.

Figure 3:
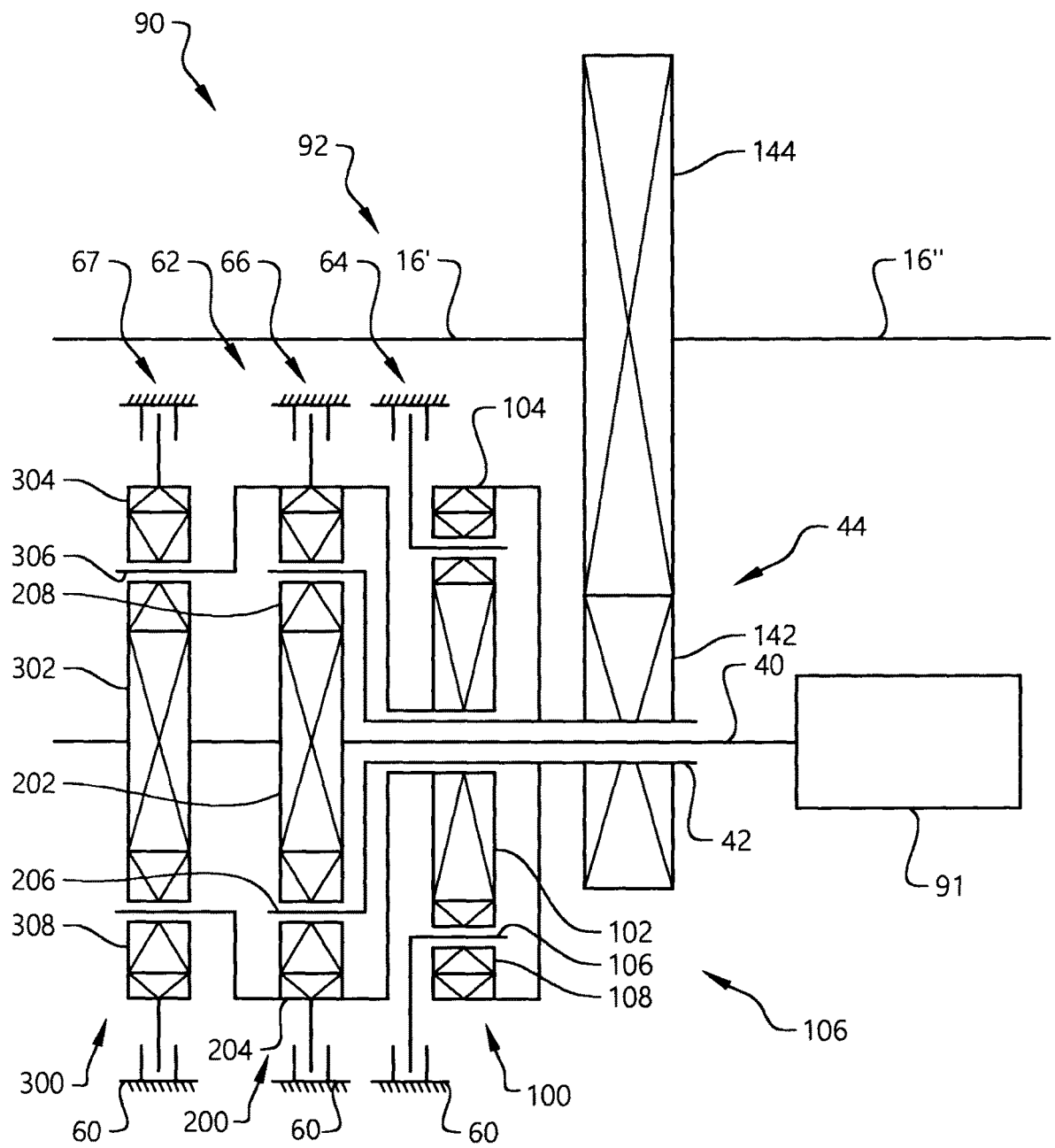
FIG. 3 is a schematic view of a first driveline according to an example embodiment.

In order to describe the first driveline 90 in further detail, reference is now made to FIG. 3 which is a schematic view of the first driveline 90 according to an example embodiment. The first driveline 90 exemplified in FIG. 3 is adapted to propel the first pair of wheels (see reference 18 in FIGS. 1 and 2) associated with the first wheel axle 16 depicted in FIGS. 1 and 2.

Irrespective of the intended use, the FIG. 3 driveline 90 comprises a first electric machine 91 and a first transmission arrangement 92 comprising an input shaft and an output shaft 42. The first electric machine 91 is adapted to feed power to the input shaft 40 and the output shaft 42 is adapted to feed power to the first pair of wheels 18.

Purely by way of example, and as indicated in FIG. 3, an output shaft of the first electric machine 91 may be rotationally fixedly connected to the input shaft 40. However, it is also envisaged that the output shaft of the first electric machine 91 may be connected to the input shaft 40 via one or more other components, such as one or more transmission components (not shown in FIG. 3).

Furthermore, the output shaft 42 may be connected to the first pair of wheels 18 via a gear set 44, in FIG. 3 exemplified as comprising a first gear wheel 142 connected to the output shaft 42 and a second gear wheel 144 connected to the left 16' and right 16" first wheel shafts, where the first 142 and second 144 gear wheels are arranged in meshed engagement with each other. However, it is also envisaged that the output shaft 42 may be connected to the first pair of wheels in other ways. For instance, it is contemplated that embodiments of the first driveline 90 may comprise an output shaft 42 that is adapted to be connected to the first pair of wheels using other or fewer intermediate components than what has been exemplified above with reference to FIG. 3. As a non-limiting example, it is envisaged that the output shaft 42 may be rotationally fixedly connected to one of the wheels of the first pair of wheels. For instance, it is contemplated that the first driveline may form a hub motor assembly for a vehicle, such as a working machine.

As can be seen in FIG. 3, the first transmission arrangement 92 comprises a first planetary gear set 100, a second planetary gear set 200 and a third planetary gear set 300. The first planetary gear set 100 comprises a first sun gear 102, a first ring gear 104 and a first planet carrier 106 carrying a first set of planet gears 108. The first set of planet gears 108 are in meshing engagement with the first ring gear 104 and the first sun gear 102. The second planetary gear set 200 comprises a second sun gear 202, a second ring gear 204 and a second planet carrier 206 carrying a second set of planet gears 208. The second set of planet gears 208 are in meshing engagement with the second ring gear 204 and the second sun gear 202. The third planetary gear set 300 comprises a third sun gear 302, a third ring gear 304 and a third planet carrier 306 carrying a third set of planet gears 308. The third set of planet gears 308 are in meshing engagement with the third ring gear 304 and the third sun gear 302.

The first transmission arrangement 92 further comprises the above described input shaft 40 and output shaft 42. The input shaft 40 is operatively connected to the second sun gear 202 and to the third sun gear 302, and connectable to the first electric machine 91. The input shaft 40 can be directly connected to the first electric machine 91 or connected to the first electric machine 91 via a transmission component, such as a clutch or a gear set. The output shaft 42 is operatively connected to the first ring gear 104 and to the second planet carrier 206.

Furthermore, and according to first transmission arrangement 92 exemplified in FIG. 3, the first sun gear 102 is operatively connected to the second ring gear 204 and to the third planet carrier 306. The second sun gear 202 is operatively connected to the third sun gear 302.

The first transmission arrangement 92 further comprises a gear selection arrangement 62 for controlling the first transmission arrangement 92 to assume various gear conditions. In particular, the first transmission arrangement 92 depicted and described in the following is configured to assume three different gear conditions, also referred to as torque transmitting gear stages. The gear selection arrangement comprises a plurality of shift elements. In detail, the gear selection arrangement comprises a first shift element 64 in the following referred to as a first locking mechanism 64, a second shift element 66 in the following referred to as a second locking mechanism 66, and a third shift element 67 in the following referred to as a third locking mechanism 67. According to the example embodiment of FIG. 3, the first locking mechanism 64 is preferably connected to the first planet carrier 106. The second locking mechanism 66 is preferably connected to the first sun gear 102, the second ring gear 204 and to the third planet carrier 306. The third locking mechanism 67 is preferably connected to the third ring gear 304.

The first 64, second 66 and third 67 locking mechanisms are all preferably arranged as a respective friction brake within a transmission housing 60, and more preferably as a respective wet lamella brake. To assume a first gear stage, the first locking mechanism 64 is arranged in an engaged state in which the first planet carrier 106 is locked to the transmission housing 60, while the second 66 and third 67 locking mechanisms are arranged in a disengaged state. To assume a second gear stage, the second locking mechanism 66 is arranged in an engaged state in which the second ring gear 204 is locked to the transmission housing 60, while the first 64 and third 67 locking mechanisms are arranged in a disengaged state. Finally, to assume a third gear stage, the third locking mechanism 67 is arranged in an engaged state in which the third ring gear 304 is locked to the transmission housing 60, while the first 64 and second 66 locking mechanisms are arranged in a disengaged state.

Figure 4:
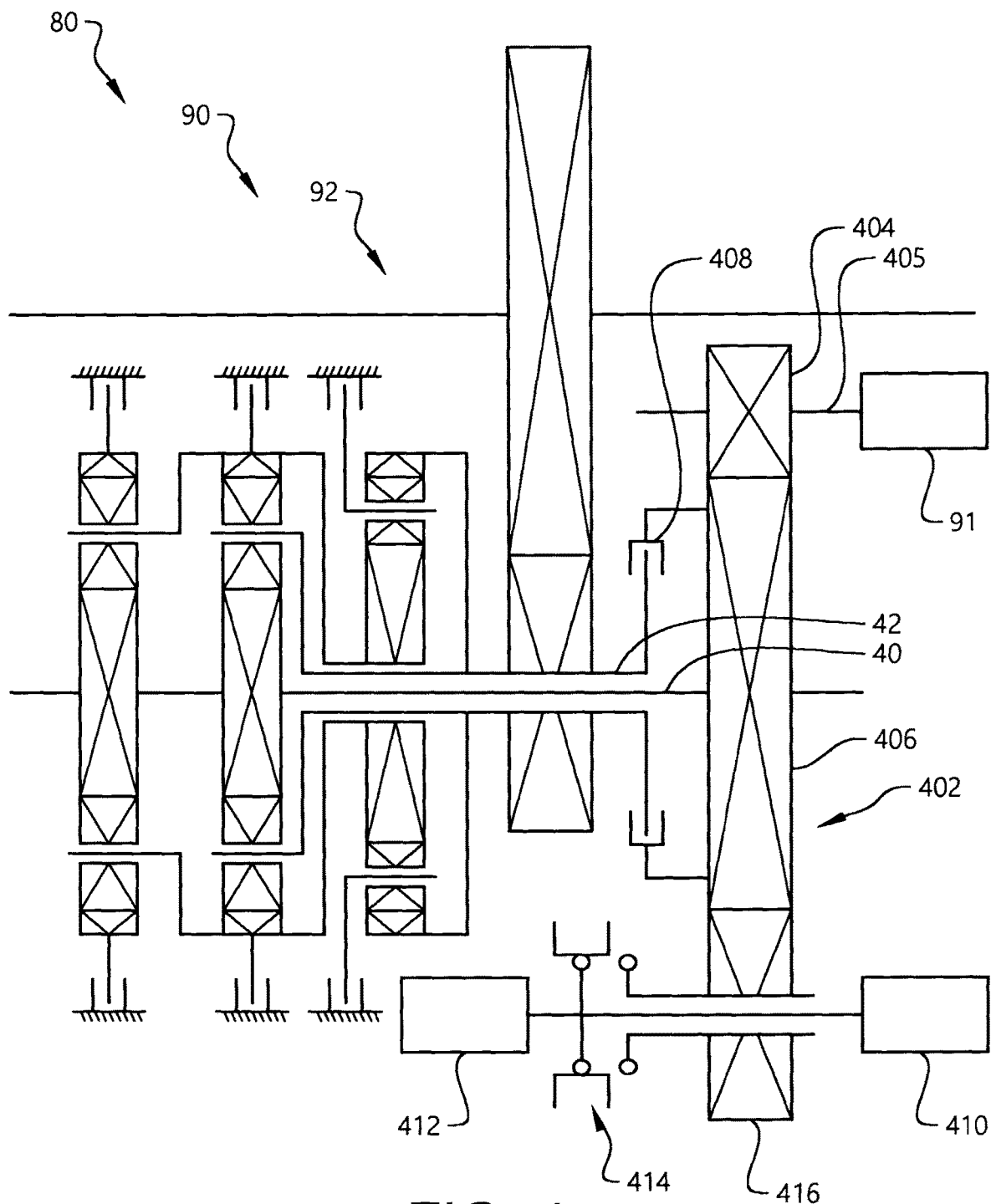
FIG. 4 is a schematic view of the first driveline according to another example embodiment.

In order to describe the first driveline 90 according to another exemplified embodiment, reference is now made to FIG. 4. The FIG. 4 example comprises all the features described above in relation to the description of FIG. 3. Thus, to simplify for the reader, all these features will not be described in the following.

As can be seen in FIG. 4, the first electric machine 91 is connected to the input shaft 40 via an additional gear set 402. The additional gear set 402 comprises a primary gear wheel 404 connected to an output shaft 405 of the first electric machine 91 and a secondary gear wheel 406 connected to the input shaft 40, wherein the primary gear wheel 404 and the secondary gear wheel 406 are arranged in meshed engagement with each other. Hereby, a gear ratio is provided between the first electric machine 91 and the input shaft 40. As can be seen, the first transmission arrangement 92 further comprises a clutch 408 arranged between the secondary gear wheel 406 and the output shaft 42. Hence, the first electric machine 91 is selectively connectable to the output shaft 42 via the clutch 408. The clutch 408 is preferably designed as a friction clutch, and more preferably as a wet lamella clutch. By engaging the clutch 408 and disengaging all the above described locking mechanisms, a fourth torque transmitting gear stage is obtained without any power flow through the planetary gear sets.

The exemplified driveline arrangement 80 depicted in FIG. 4 also comprises an additional electric machine 410 connectable to the first driveline 90. The additional electric machine 410 is operatively connected to a hydraulic auxiliary unit 412. The hydraulic auxiliary unit 412 can, for example, be a power take off unit of the working machine 10 which is arranged to operate one or more hydraulic pumps for providing hydraulic pressure to e.g., dumping, steering and braking systems of the working machine 10. The additional electric machine 410 is further connected to an additional clutch 414. According to an example, the additional clutch 414 may be a dog clutch. Such a dog clutch may be synchronized by adapting the speed of the additional electric machine 410. The additional clutch 414 is also connected to a third gear wheel 416 which is arranged in meshed engagement with the secondary gear wheel 406. Hereby, the additional electric machine 410 is selectively connectable to the input shaft 40 via the additional clutch 414. Since the secondary gear wheel 406 is selectively connectable to the output shaft 42 via the clutch 408, the additional electric machine 410 is hereby also selectively connectable to the output shaft 42 via the clutch 408 and the additional clutch 414.

Figure 5:
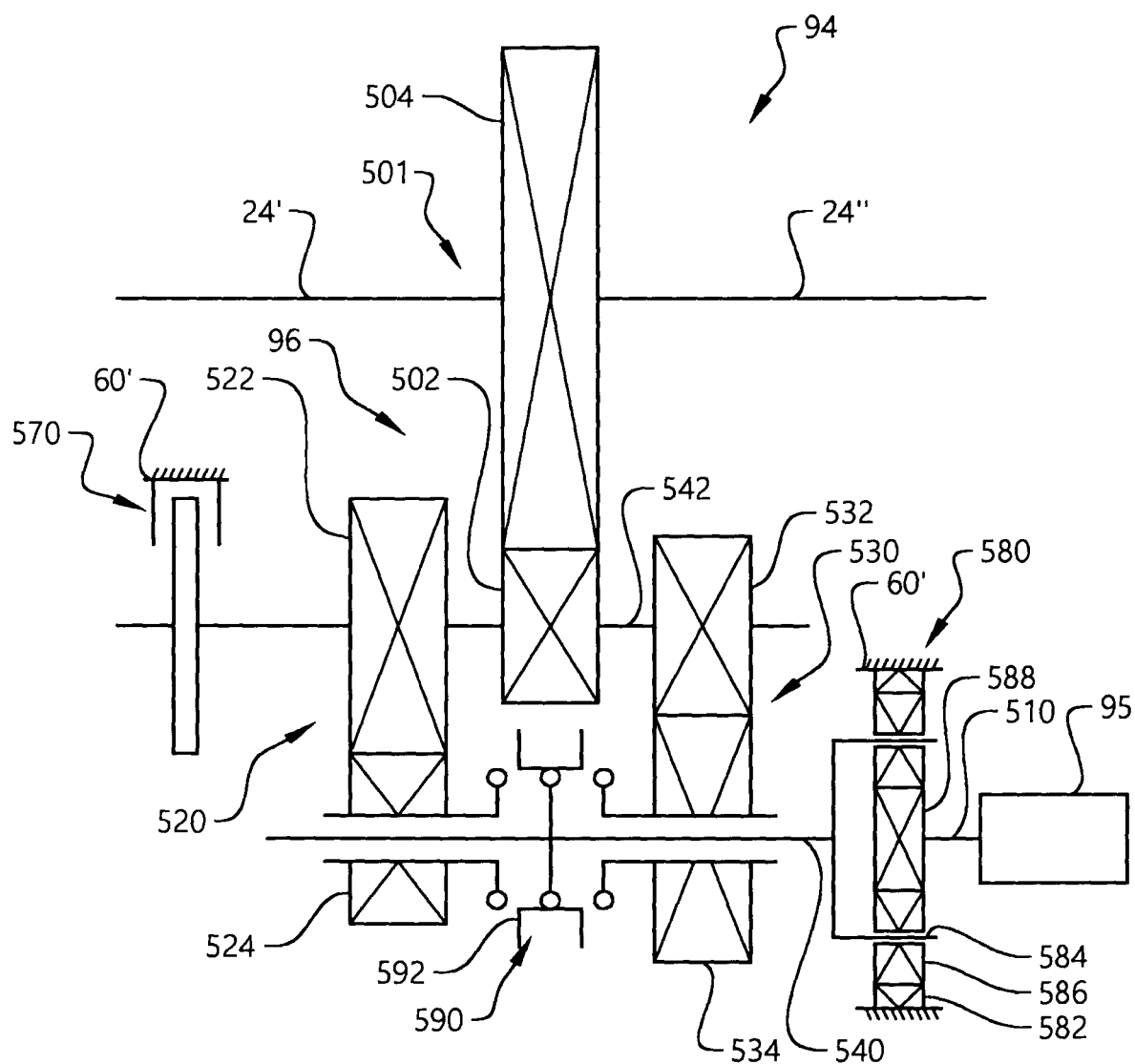
FIG. 5 is a schematic view of a second driveline according to an example embodiment.
Figure 6:
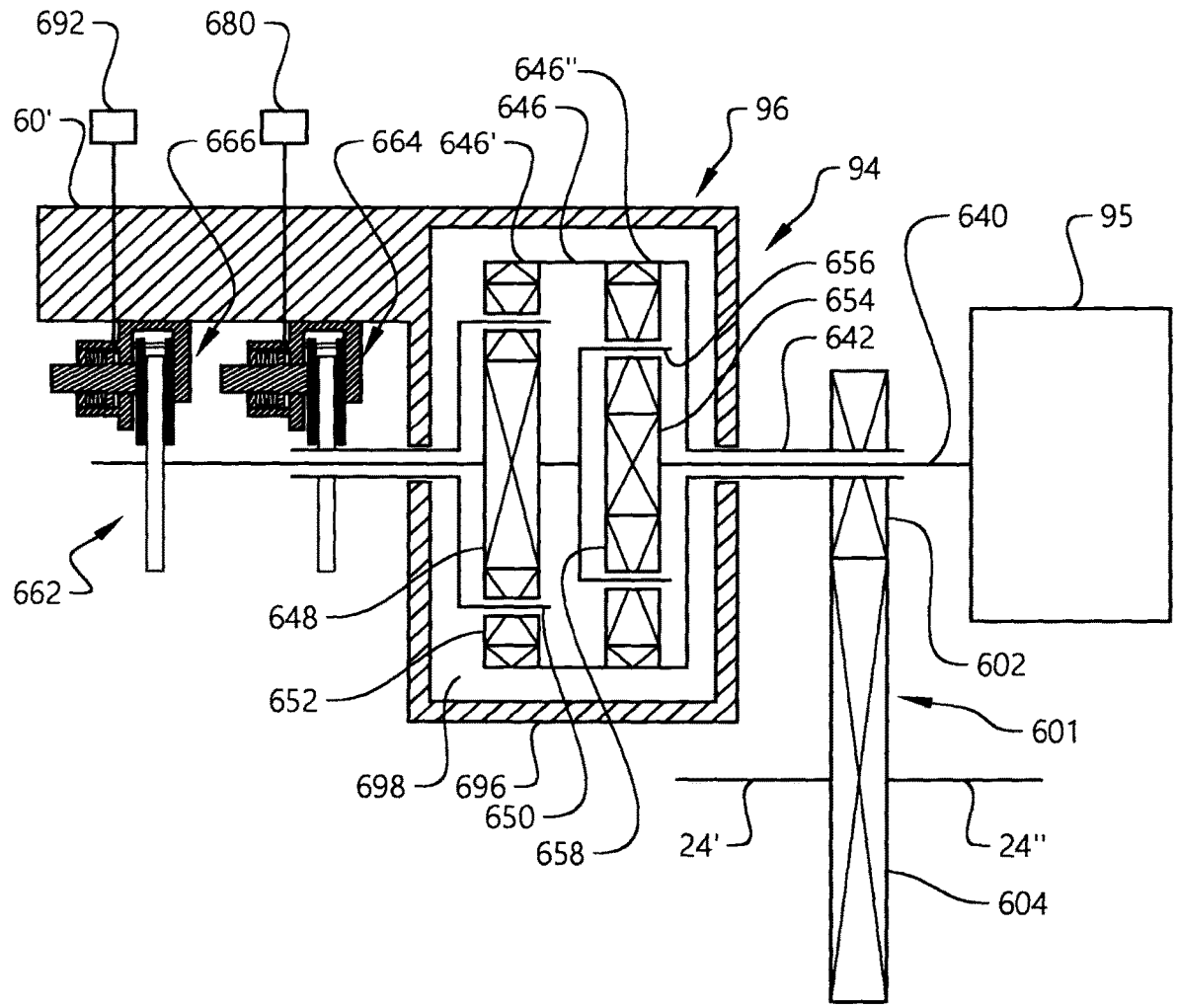
FIG. 6 is a schematic view of the second driveline according to another example embodiment.

The above disclosure in relation to FIGS. 3 and 4 has been focused on describing two exemplified first drivelines 90. Reference is therefore now made to FIGS. 5 and 6 to describe two exemplified embodiments of the second driveline 94. The examples described in relation to FIGS. 5 and 6 can also be implemented in the above described third driveline 97 as well.

Starting with FIG. 5; a schematic view of the second driveline 94 according to an example embodiment is shown. The second driveline 94 in FIG. 5 comprises a second electric machine 95 and a second transmission arrangement 96. The second transmission arrangement 96 comprises an input shaft 540 connected to the second electric machine 95 and an output shaft 542 connected to the second pair of wheels (28 in FIGS. 1 and 2) via the second wheel shafts 24', 24". As can be seen in FIG. 5, the output shaft 542 may be connected to the second pair of wheels 28 via a gear set 501 of the second transmission arrangement 96, in FIG. 5 exemplified as comprising a first gear wheel 502 connected to the output shaft 542 and a second gear wheel 504 connected to the second wheel shafts 24', 24", where the first 502 and second 504 gear wheels are arranged in meshed engagement with each other. However, it is also envisaged that the output shaft 542 may be connected to the second pair of wheels in other ways. For instance, it is contemplated that embodiments of the second driveline 94 may comprise an output shaft 542 that is adapted to be connected to the second pair of wheels 28 using other or fewer intermediate components than what has been exemplified above with reference to FIG. 5. As a non-limiting example, it is envisaged that the output shaft 542 may be rotationally fixedly connected to one of the wheels of the second pair of wheels. For instance, it is contemplated that the second driveline may form a hub motor assembly for a vehicle, such as a working machine.

Further, the second electric machine 95 is connected to the input shaft 540 via a planetary gear set 580. The planetary gear set 580 comprises a ring gear 582, a planet carrier 584 carrying a set of planet gears 586, and a sun gear 588. The set of planet gears 586 meshes with the sun gear 588 and the ring gear 582. An output shaft 510 of the second electric machine 95 is operatively connected to the sun gear 588 and the input shaft 540 of the second transmission arrangement 96 is operatively connected to the planet carrier 584. The ring gear 582 is fixedly attached to the housing 60' and thus kept stationary.

The second transmission arrangement 96 further comprises a first gear set 520 comprising a first gear wheel 522 connected to the output shaft 542 and a second gear wheel 524 connectable to the input shaft 540 via a gear selection clutch 590. The first 522 and second 524 gear wheels of the first gear set 520 are arranged in meshing engagement with each other.

The second transmission arrangement 96 also comprises a second gear set 530 comprising a first gear wheel 532 connected to the output shaft 542 and a second gear wheel 534 connectable to the input shaft 540 via the gear selection clutch 590. The first 532 and second 534 gear wheels of the second gear set 530 are arranged in meshing engagement with each other.

The gear selection clutch 590 is preferably a dog clutch comprising a sliding sleeve 592 selectively connectable to the second gear wheel 524 of the first gear set 520 and to the second gear wheel 534 of the second gear set 530. The second transmission arrangement 96 is hereby configured to assume a first torque transmitting gear stage in which the sliding sleeve 592 is connected to the second gear wheel 524 of the first gear set 520, and a second torque transmitting gear stage in which the sliding sleeve 592 is connected to the second gear wheel 534 of the second gear set 530.

The second transmission arrangement 96 thus comprises two torque transmitting gear stages. The second transmission arrangement 96 is also configured to assume a neutral gear stage in which no torque is directed from the second electric machine 95 to the second pair of wheels 28. The neutral gear stage is obtained by disconnecting the sliding sleeve 592 from the second gear wheel 524 of the first gear set 520, as well as from the second gear wheel 534 of the second gear set 530. A freewheeling functionality of the second transmission arrangement 96 is hereby obtained.

As can be seen in FIG. 5, the second transmission arrangement 96 also comprises a parking brake 570. The parking brake 570 is arranged between the output shaft 542 and the transmission housing 60' and is arranged to lock the output shaft 542 to the transmission housing 60'. Accordingly, when the parking brake 570 is engaged, the output shaft 542, and in turn also the second pair of wheels 28, are stationary.

Referring now to FIG. 6 which is a schematic view of the second driveline 94 according to another example embodiment. In a similar vein as the exemplified second driveline 94 described above in relation to FIG. 5, the second driveline 94 in FIG. 6 also comprises a second electric machine 95 and a second transmission arrangement 96. The second transmission arrangement 96 comprises an input shaft 640 connected to the second electric machine 95 and an output shaft 642 connected to the second pair of wheels (28 in FIGS. 1 and 2) via the second wheel shafts 24', 24". As can be seen in FIG. 6, the output shaft 642 may be connected to the second pair of wheels 28 via a gear set 601 of the second transmission arrangement 96, in FIG. 6 exemplified as comprising a first gear wheel 602 connected to the output shaft 642 and a second gear wheel 604 connected to the second wheel shafts 24', 24", where the first 602 and second 604 gear wheels are arranged in meshed engagement with each other. However, it is also envisaged that the output shaft 642 may be connected to the second pair of wheels in other ways. For instance, it is contemplated that embodiments of the second driveline 94 may comprise an output shaft 642 that is adapted to be connected to the second pair of wheels 28 using other or fewer intermediate components than what has been exemplified above with reference to FIG. 6. As a non-limiting example, it is envisaged that the output shaft 642 may be rotationally fixedly connected to one of the wheels of the second pair of wheels. For instance, it is contemplated that the second driveline may form a hub motor assembly for a vehicle, such as a working machine.

As can be seen from FIG. 6, the second transmission arrangement 96 comprises a common ring gear assembly 646, a first sun gear 648, a first planet carrier 650 carrying a set of planet gears 652, a second sun gear 654 and a second planet carrier 656 carrying a set of planet gears 658. The set of planet gears 652, 658 of each one of the first 650 and second 656 planet carriers meshes with the common ring gear assembly 646.

The set of planet gears 652 of the first planet carrier 650 meshes with the first sun gear 648 and the set of planet gears 658 of the second planet carrier 656 meshes with the second sun gear 654.

The second transmission arrangement 96 further comprises a transmission housing 60'. Moreover, the second transmission arrangement 96 is configured such that the second sun gear 654 is adapted to be connected to the input shaft 640, the common ring gear assembly 646 is adapted to be connected to the output shaft 642, and the second planet carrier 656 and the first sun gear 648 are operatively connected to each other.

Moreover, and as indicated in FIG. 6, the second planet carrier 656 and the first sun gear 648 can be operatively connected by being rotationally fixedly connected to each other.

Furthermore, and as indicated in FIG. 6, the second transmission arrangement 96 comprises a gear selection arrangement 662. The gear selection arrangement 662 comprises a first shift element 664, preferably a first friction shift element. The first shift element will in the following be referred to as a first locking mechanism 664. The first locking mechanism 664 is adapted to be controlled by a first fluid pressure conducted to the first locking mechanism 664 such that for at least a first fluid pressure equal to zero overpressure, the first locking mechanism 664 is adapted to assume a locked condition in which the first planet carrier 650 is locked to the transmission housing 60'. The gear selection arrangement 662 also comprises a second shift element 666, preferably a second friction shift element. The second shift element will in the following be referred to as a second locking mechanism 666. The second locking mechanism 666 is adapted to be controlled by a second fluid pressure conducted to the second locking mechanism 666 such that for at least a second fluid pressure equal to zero overpressure, the second locking mechanism 666 is adapted to assume a locked condition in which the second planet carrier 656 and the first sun gear 648 are locked to the transmission housing 60'.

Moreover, though purely by way of example, the FIG. 6 implementation of the gear selection arrangement 662 is such that the first locking mechanism 664 is further adapted to assume a set of first locking mechanism non-locked conditions in which the first planet carrier 650 is allowed to rotate relative to the transmission housing 60' and wherein the second locking mechanism 666 is further adapted to assume a set of second locking mechanism non-locked conditions in which the second planet carrier 656 and the first sun gear 648 are allowed to rotate relative to the transmission housing 60'. For a first fluid pressure equal to or higher than a first fluid pressure threshold, the first locking mechanism 664 is adapted to assume a released condition in which the first planet carrier 650 is free to rotate relative to the transmission housing 60', the released condition forming part of the set of first locking mechanism non-locked conditions. For at least one first intermediate pressure between zero overpressure and the first fluid pressure threshold, the first locking mechanism 664 is adapted to assume a slipping condition in which a relative rotation is allowed but braking torque is applied between the transmission housing 60' and the first planet carrier 650, the slipping condition forming part of the set of first locking mechanism non-locked conditions. For a second fluid pressure equal to or higher than a second fluid pressure threshold, the second locking mechanism 666 is adapted to assume a released condition in which the second planet carrier 656 and the first sun gear 648 are free to rotate relative to the transmission housing 60', the released condition forming part of the set of second locking mechanism non-locked conditions. Also, for at least one second intermediate pressure between zero overpressure and the second fluid pressure threshold, the second locking mechanism 666 is adapted to assume a slipping condition in which a relative rotation is allowed but braking torque is applied between the transmission housing 60' and the second planet carrier 656 and the first sun gear 648, said slipping condition forming part of said set of second locking mechanism non-locked conditions.

The first locking mechanism 664 may be implemented in a plurality of ways. Purely by way of example, the first locking mechanism 664 may be implemented as an on-off locking mechanism, such as a dog clutch, adapted to assume either a fully locked or a fully released condition. As such, though purely by way of example, the set of first locking mechanism non-locked conditions may contain only one non-locked condition, i.e. a fully released condition as exemplified above.

In a similar vein, the second locking mechanism 666 may be implemented in a plurality of ways. Purely by way of example, the second locking mechanism 666 may be implemented as an on-off locking mechanism, such as a dog clutch, adapted to assume either a fully locked or a fully released condition. As such, though purely by way of example, the set of second locking mechanism non-locked conditions may contain only one non-locked condition, i.e. a fully released condition as exemplified above.

Purely by way of example, each one of the first locking mechanism 664 and the second locking mechanism 666 is a parking brake. As such, each one of the first and second locking mechanisms 664, 666 may be implemented such that it assumes a locked condition at least when a fluid pressure conducted to the locking mechanism is equal to zero overpressure.

The second transmission arrangement 96 depicted in FIG. 6 is hereby adapted to assume two torque transmitting gear stages. A first torque transmitting gear stage is obtained by controlling the first locking mechanism 664 to assume the fully locked condition, while also controlling the second locking mechanism 666 to assume the fully released condition. A second torque transmitting gear stage is obtained by controlling the first locking mechanism 664 to assume the fully released condition, while also controlling the second locking mechanism 666 to assume the fully locked condition. The second transmission arrangement 96 is also adapted to assume a neutral gear stage in which no torque is directed from the second electric machine 95 to the second pair of wheels 28. The neutral gear stage is obtained by controlling the first 664 and second 666 locking mechanisms to assume the released condition. A parking brake functionality is obtained when controlling the first 664 and second 666 locking mechanisms to assume the fully locked condition.

Figure 7:
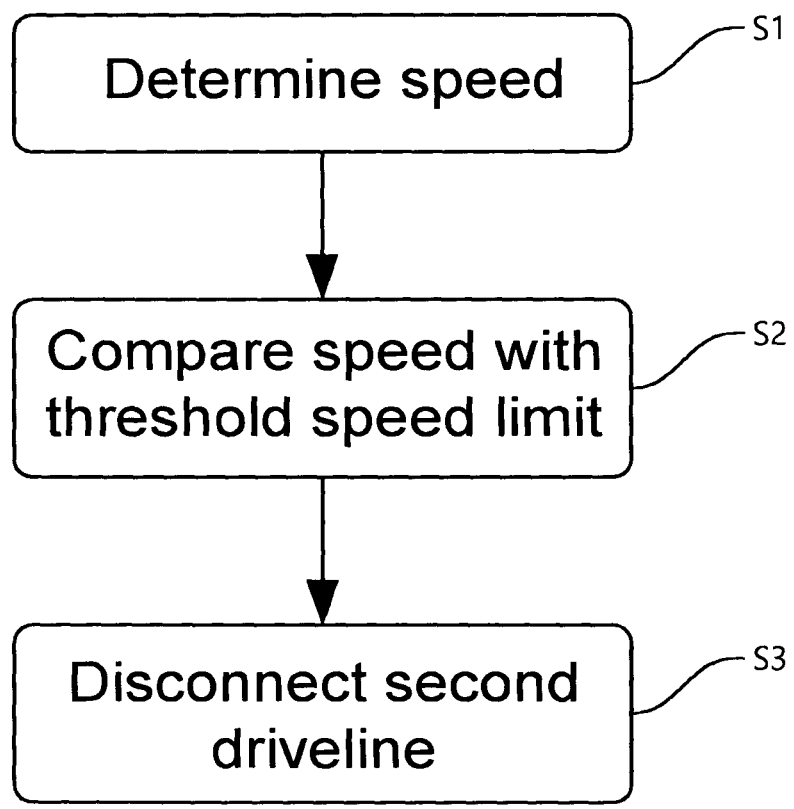
FIG. 7 is a flow chart of controlling a driveline arrangement according to an example embodiment.

In order to sum up, reference is now made to FIG. 7 which is a flow chart of a method of controlling a driveline arrangement 80 according to an example embodiment. During operation of the working machine 10, the control unit 1 determines S1 a speed of the working machine 10. The control unit 1 compares S2 the speed of the working machine 10 with the above described predetermined threshold speed limit. As also described above, the predetermined threshold speed limit is the maximum speed limit operable by the second driveline 94. When the speed of the working machine 10 exceeds the predetermined threshold speed limit, the control unit 1 controls the second driveline 94 to be disconnected S3 from propelling the second pair of wheels 28. Disconnecting the second driveline from propelling the second pair of wheels 28 is preferably obtained by controlling the second transmission arrangement 96 to assume the neutral gear stage. According to e.g., the second driveline 94 depicted in FIG. 5, the neutral gear stage is obtained by disconnecting the sliding sleeve 592 from the second gear wheel 524 of the first gear set 520, as well as from the second gear wheel 534 of the second gear set 530.

It is to be understood that the present disclosure is not limited to the embodiments described above and illustrated in the drawings; rather, the skilled person will recognize that many changes and modifications may be made within the scope of the appended claims.

The invention claimed is:

1. A driveline arrangement for propelling a working machine, the driveline arrangement comprising:
    a first driveline comprising a first electric machine and a first transmission arrangement, the first driveline being configured to propel a first pair of wheels at a speed range between zero speed and a maximum speed limit of the working machine;
    a second driveline comprising a second electric machine and a second transmission arrangement, the second driveline being configured to propel a second pair of wheels at a speed range between zero speed and a predetermined threshold speed limit of the working machine, wherein the predetermined threshold speed limit is lower than the maximum speed limit; and
    a control unit connected to the first and second drivelines, the control unit comprising control circuitry configured to control the second driveline to assume a disengaged state in which the second driveline is disconnected from propelling the second pair of wheels when a speed of the working machine exceeds the predetermined threshold speed limit.

2. The driveline arrangement according to claim 1, wherein the second transmission arrangement comprises a neutral gear stage, the control circuitry being configured to control the second driveline to arrange the second transmission arrangement in the neutral gear stage when controlling the second driveline to assume the disengaged state.

3. The driveline arrangement according to claim 1, wherein each one of the first and second transmission arrangements comprises at least two torque transmitting gear stages.

4. The driveline arrangement according to claim 3, wherein the first transmission arrangement comprises at least three torque transmitting gear stages and the second transmission arrangement comprises no more than two torque transmitting gear stages.

5. The driveline arrangement according to claim 1, wherein the first transmission arrangement comprises a plurality of friction shift elements for changing between gear stages.

6. The driveline arrangement according to claim 5, wherein the control circuitry is configured to control one of the friction shift elements to assume a slipping state during a gear shift.

7. The driveline arrangement according to claim 1, wherein the second driveline is further configured to propel a third pair of wheels at the speed range between zero speed and the predetermined threshold speed limit of the working machine.

8. The driveline arrangement according to claim 1, wherein the driveline arrangement further comprises an additional electric machine configured to propel a hydraulic auxiliary unit of the working machine, the additional electric machine being connectable to the first driveline.

9. The driveline arrangement according to claim 8, wherein the control circuitry is configured to control the first driveline to connect to the additional electric machine for propelling the first pair of wheels when the second driveline assumes the disengaged state.

10. The driveline arrangement according to claim 1, wherein the first transmission arrangement comprises a plurality of planetary gear sets, each planetary gear set comprising a set of planetary members, wherein the set of planetary members comprises a sun gear, a ring gear and a planet carrier carrying a set of planet gears.

11. The driveline arrangement according to claim 10, wherein one member of the set of planetary members for each one of the plurality of planetary gear sets of the first transmission arrangement is connected to one of a plurality of friction shift elements for changing between gear stages.

12. The driveline arrangement according to claim 1, wherein the second transmission arrangement comprises a plurality of planetary gear sets, each planetary gear set of the second transmission arrangement comprising a set of planetary members, wherein the set of planetary members comprises a sun gear, a ring gear and a planet carrier carrying a set of planet gears.

13. The driveline arrangement according to claim 12, wherein the second transmission arrangement comprises a gear selection arrangement, and a transmission housing, wherein the gear selection arrangement comprises:
    a first locking mechanism connected to a member of the set of planetary members for a first planetary gear set of the second transmission arrangement, the first locking mechanism being adapted to be controlled by a first fluid pressure conducted to the first locking mechanism such that:
        for at least a first fluid pressure equal to zero overpressure, the first locking mechanism is adapted to assume a locked condition in which said member of the first planetary gear set is locked to the transmission housing, and
    a second locking mechanism connected to a member of the set of planetary members for a second planetary gear set of the second transmission arrangement, the second locking mechanism being adapted to be controlled by a second fluid pressure conducted to the second locking mechanism such that:
        for at least a second fluid pressure equal to zero overpressure, the second locking mechanism is adapted to assume a locked condition in which said member of the second planetary gear set is locked to the transmission housing.

14. A working machine, comprising the driveline arrangement according to claim 1.

15. A method of controlling a driveline arrangement of a working machine, the driveline arrangement comprising:
    a first driveline comprising a first electric machine and a first transmission arrangement, the first driveline being configured to propel a first pair of wheels at a speed range between zero speed and a maximum speed limit of the working machine; and
    a second driveline comprising a second electric machine and a second transmission arrangement, the second driveline being configured to propel a second pair of wheels at a speed range between zero speed and a predetermined threshold speed limit of the working machine, wherein the predetermined threshold speed limit is lower than the maximum speed limit; wherein the method comprises the steps of:
determining a speed of the working machine;
comparing the speed of the working machine with the predetermined threshold speed limit, and
disconnecting the second driveline from propelling the second pair of wheels when the speed of the working machine exceeds the predetermined threshold speed limit.

* * * * *